United States Patent [19]
Kerry

[11] Patent Number: 5,499,653
[45] Date of Patent: Mar. 19, 1996

[54] SECURITY DEVICES FOR FLUID FLOW LINES

[76] Inventor: Malcolm Kerry, 4 Holbeck Towers, Leeds, LS11 4NN, West Yorkshire, England

[21] Appl. No.: 284,644
[22] PCT Filed: Mar. 12, 1993
[86] PCT No.: PCT/GB93/00525
  § 371 Date: Aug. 16, 1994
  § 102(e) Date: Aug. 16, 1994
[87] PCT Pub. No.: WO93/18943
  PCT Pub. Date: Sep. 30, 1993

[30] Foreign Application Priority Data

Mar. 14, 1992 [GB] United Kingdom .................. 9205605
Feb. 11, 1993 [GB] United Kingdom ................ 93002684

[51] Int. Cl.[6] ............................................. F16K 35/00
[52] U.S. Cl. .................. 137/354; 137/315; 137/384.2
[58] Field of Search ............................ 137/384.2, 354, 137/315

[56] References Cited

U.S. PATENT DOCUMENTS 1,217,406  2/1917  Burkhardt ..................... 137/384.2
1,236,363  8/1917  Riley .............................. 137/384.2
2,881,789  4/1959  Finazzo ......................... 137/384.2
3,695,287  10/1972 Reese et al. .
3,731,703  5/1973  Hubenthal ...................... 137/384.2
3,855,828  12/1974 Verderber .

FOREIGN PATENT DOCUMENTS

A25254  11/1913  United Kingdom .

*Primary Examiner*—A. Michael Chambers
*Attorney, Agent, or Firm*—Klauber & Jackson

[57] ABSTRACT

A security device, particularly for a motor vehicle, which is adapted to isolate the fuel supply from the engine of the vehicle is disclosed. The security device comprises a first body member locatable at one side of a vehicle floor and a second body member locatable at an opposite, second side of said floor, said body members being securable together through said floor by securing means located at said second side, and engaging means extending from a lower surface of said first body member, a rotatable locking device located in said first body member and a rotatable valve member located in said second body member and being movable, upon rotation of said locking device, from a first position allowing fuel to flow through said valve member to a second position preventing such flow, the security device being devoid of any release means at said one side of said vehicle floor.

9 Claims, 2 Drawing Sheets

SECURITY DEVICES FOR FLUID FLOW LINES

This invention relates to security devices for fluid flow lines, particularly but not exclusively for motor vehicles such as cars, vans, lorries, and other such vehicles.

The theft of motor vehicles is a very serious problem and is becoming more prevalent, and the situation is becoming increasingly dangerous due to the so-called 'joy riders', many of whom are under-aged and inexperienced drivers, taking away vehicles and driving them at speeds far in excess of the legal limits. Many accidents - and deaths - have been caused by these so-called 'joy riders'.

There have been many proposals for motor vehicle security devices which are designed and intended to cut-off or isolate the fuel supply to the engine from a supply source, but none of the prior proposed devices have proved totally secure and satisfactory. This has been due in no small part to the fact that, although the main component parts of the devices are located beneath the floor of the vehicle, access to such component parts can be had through said floor from the interior of the vehicle, and indeed the whole device in many instances can be loosened - and subsequently removed - by releasing securing means located above the floor and within the vehicle. Such prior devices are rendered ineffectual within minutes, and in some cases within seconds, and have proved totally unsatisfactory in preventing the unauthorised removal and driving of a motor vehicle, and the present invention seeks to provide an improved form of security device which will obviate the disadvantages of prior proposed security devices.

According to the present invention there is provided a security device for insertion into the fluid fuel line of a member, said device including a first body member locatable at one side of a floor or wall of said member and a second body member locatable at an opposite, second side of said floor or wall and being securable to said first body member, a rotatable locking device located in said first body member, and a rotatable valve member located in said second body member, said valve member being movable, upon rotation of said locking device, from a first position allowing fluid to flow through said valve member to a second position preventing such flow, said body members being securable together by means located at said second side of said floor or wall engaging means extending from a surface of said first body member which confronts the floor or wall, said device being devoid of any release means at said one side of said floor or wall.

Preferably, said means extending from the said surface of said first body member will be a plurality of threaded shanks or spigots which are secured in blind bores in said surface of said first body member.

Said threaded shanks or spigots will preferably pass through through-bores in said second body member and will be engageable by securing devices so as to secure the first and second body members together.

The first body member will preferably include a domed portion for housing said locking device, said locking device being held captive within said first body member by means located beneath said domed portion and within the confines of said first body member.

Said second body member will preferably include a recess for housing said rotatable valve member, said second body member including a through-bore communicationg with said recess and said valve member when located therein.

In order that the invention may be more readily understood, embodiments of the invention will now be described, by way of example only, reference being made to the accompanying drawings, wherein.

Figure 1:
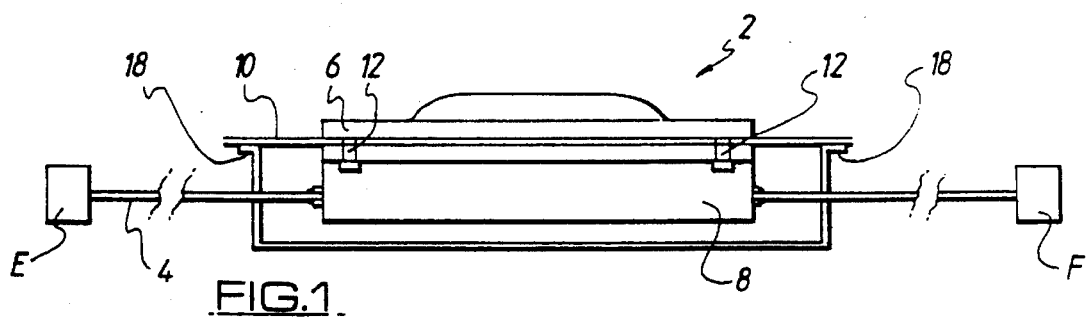
FIG. 1 is a schematic view of a security device in accordance with the invention and showing the device located in a fuel line of a motor vehicle.
Figure 2:
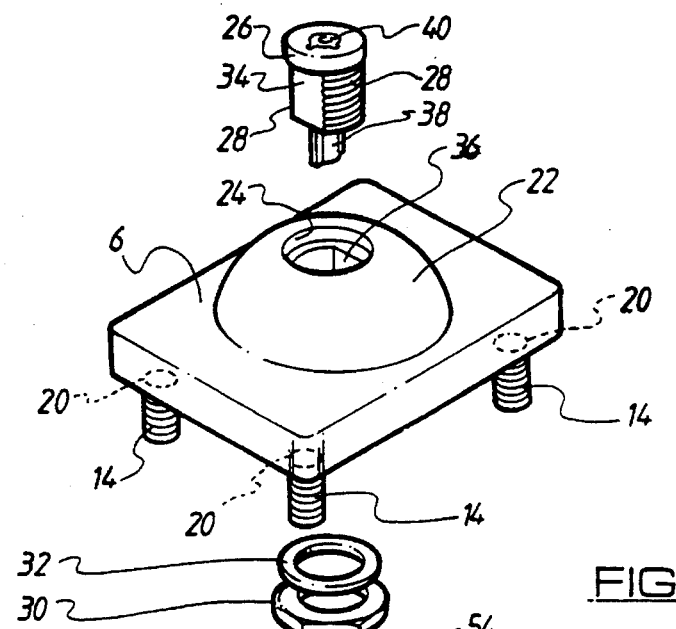
FIG. 2 is an exploded perspective view of the security device shown in FIG. 1.

Referring to the drawings and firstly to FIGS. 1 and 2, a security device indicated generally by reference numeral 2 is shown located in a fuel line 4 of a motor vehicle (not shown) between a fuel supply source such as a fuel tank F and an engine E of the vehicle.

The security device includes first and second body members 8 which are located on opposite, upper and lower, sides of a floor 10 of the vehicle and which are secured together by means of threaded nuts 12 having seperable sleeves engaging threaded shanks or spigots 14 extending downwardly from the underside of the first body member 6. The security device is screened and protected by means of a cover 16 secured at 18 to the lower surface of the floor 10 of the vehicle. The cover 16 is composed of metal, and more preferably of galvanised steel.

FIG. 2 shows the security device in detail. The security device comprises the first and second body members 6 and 8 which are connected together by means of the threaded nuts and sleeves 12 engaging the threaded shanks or spigots 14 which form part of and which extend from the underside or lower surface of said first body member 6. The shanks or spigots 14, of which there are four, are located in and extend from blind bores 20 in said first body member 6 such that the shanks or spigots are not accessible from the upper surface of the first body member 6. The shanks or spigots 14 pass through through-bores 22 in the second body member 8.

It will thus be understood that the first body member 6 is located on the upper side of the vehicle floor and within the interior of the vehicle, whilst the second body member 8 is located on the opposite, underside of said floor - outside the interior of the vehicle - such that the floor of the vehicle is sandwiched between the first and second body members.

The first body member 6 has an integral domed portion 22 and a centrally located vertical bore 24 in which is located a rotatable locking device 26, part of the body of which is screw-threaded as indicated at 28 such that it may be engaged by a threaded nut 30 to secure the locking device within the body member 6, a washer 32 being interposed between the nut 30 and the underside of the domed portion 22. To prevent inadvertent rotation of the body of the locking device 26 within the bore 24, said body includes parallel-sided portions - one is indicated by reference numeral 34 - which engage parallel-sided portions of the bore 24, one of said parallel-sided portions being indicated by reference numeral 36. The locking device has an outwardly extending member 38 which is rotatable relative to the body of the locking device 26 when a key (not shown) is inserted in the key-hole 40 and turned relative to the locking device body.

The locking device 26 will be a high security device, and preferably a 10-pin locking device, so as to increase the security of the device and so as to remove the likelihood of the locking device being so-called 'slide hammered' or otherwise removed.

The second body member 8 has a vertical bore 42 and a through-bore 44 which extends inwardly from either end of the second body member and which communicates with said vertical bore 42. Located in the vertical bore 42 is a rotatable valve member 46 whose upper surface is recessed at 48 to accommodate the member 38 of the locking device 26 and which has a through-bore 50 therein. The valve member 46 carries a plurality of O-ring seals 52 which engage the surface of the bore 42 to prevent leakage of fuel from the bore 42 and upwardly through the locking device 26.

The valve member 46 is retained within the bore 42 by means of a washer 54 which is preferably burred so as to be semi-permanently secured in position.

Securable in the through-bore 44 - at each outer end thereof - are threaded straight male adaptors 56 and 58 which in turn are engaged by nut and sleeves 60 and 62 carried on the ends of the fuel supply line 4.

In use, and with the security device assembled and located in position as shown in FIG. 1, a key is inserted in the key-hole 40 and turned relative to the body of the locking device 26. This has the effect of rotating the member 38 which, being located in the recess 48 of the valve member 46, will cause rotation of the valve member 46 and hence will move the through-bore 50 therein from a first position which allows fuel to pass through the valve member 46 and second body member 8 to a second position in which such flow is prevented.

The nuts and sleeves 12 are such that when a certain torque is applied to the nuts, the nuts will separate from the sleeves and snap off, such that the remaining sleeves - screw-threaded onto the shanks or spigots 14 - cannot be removed from the shanks or spigots.

With a security device as above described, it will be seen that the device is completely devoid of any release means above the floor of the vehicle. There are no fastening or securing means on the upper side of the floor and within the interior of the vehicle, thus ensuring that the security device cannot be removed or interfered with from within the vehicle. All that is visible and accessible from within the vehicle is the first body member 6 and the top of the locking device 26 - which top is flush with and co-planar with the top of the domed portion 22 - thus making it impossible for the security device to be interfered with or removed from its operative position, and hence making it impossible for the vehicle to be driven and removed. Thus the device is completely secure and cannot, it is thought, be removed, since there is no part of the device that can be levered away from the floor or otherwise intefered with.

Figure 3:
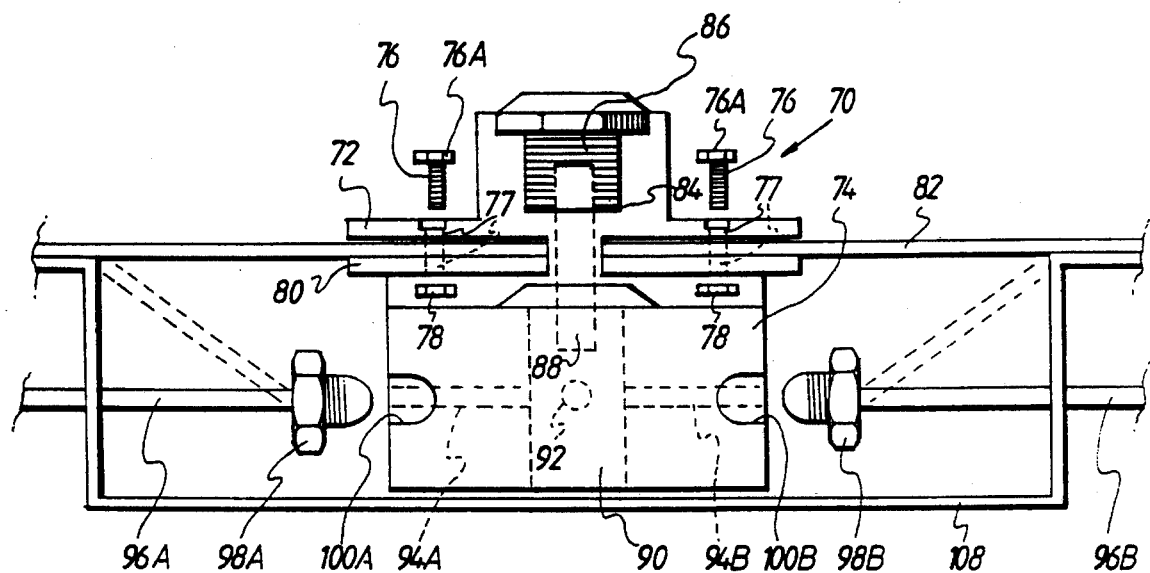
FIG. 3 is a cross-sectional elevation of a security device in accordance with an alternative embodiment of the invention.
Figure 4:
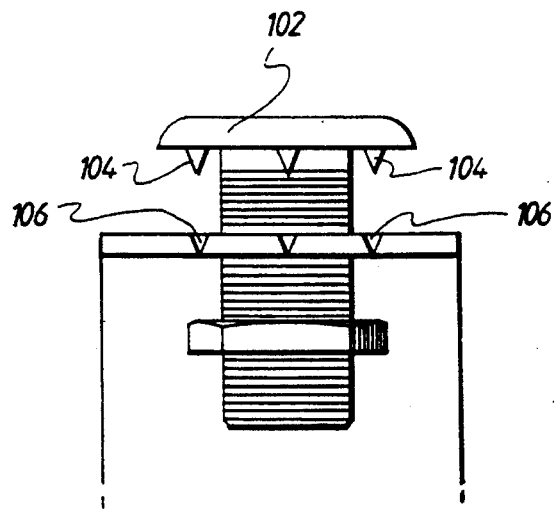
FIG. 4 is a side view of part of FIG. 1.

Referring now to FIGS. 3 and 4, the security device indicated generally by reference numeral 70 comprises a first body member 72 and a second body member 74, the two body members being secured together by threaded members 76 passing downwardly through bores 77 in the two bodies and being engaged by threaded nuts 78 which bear on the underside of a flange 80 of the second body member 74. The heads 76A of the threaded members 76 are located below the surface 72A of the first body member 72 such that they cannot be unscrewed from that side of the body member. In this position, the first body member 72 is above the floor 82 of a vehicle,-whilst the second body member 74 is located below said floor.

The first body member 72 and the second body member 74 are preferably composed of a hardened steel or other suitably hardened material, but the second body member 74 may be composed of a suitable synthetic plastics material, if preferred.

The first body member 72 has a vertical bore 84 therein in which is located a locking device 86 which upon actuation by a key (not shown) is rotatable within said bore. Depending from said locking device 86 is a connecting bar 88 which engages in a slot in a rotatable valve member 90 located in a vertical bore of the second body member 74, the valve member 90 having a through-bore 92 therein.

Said second body member 74, in addition to having the vertical bore for the valve member 90, has a horizontal through-bore or passage 94A and 94B which communicates with the valve member 90 and which is connectable to a fuel line 96A and 96B by threaded heads 98A and 98B engaging in threaded recesses 100A and 100B in the second body member 74.

The locking device 86, referring now specifically to FIG. 4, includes a spring-loaded head 102 which has on its undersurface a series of shaped splines 104 which, when the head 102 is moved downwardly towards the first body member, engages a series of correspondingly shaped recesses 106 in the upper surface of the member 72, such that the locking device cannot be forcibly removed as by chiselling or 'slide hammering', and so on.

If desired, the top of the locking device may be located below the top of the first body member 72 so as to lessen the likelihood of unauthorised removal of the device.

In use, the security device is located in the floor of the vehicle as shown in FIG. 3 and the threaded members 76 and nuts 78 are engaged so as to secure the two body members together and hence secure the device in position. The fuel line 96A and 96B is secured to the second body member 74, whereafter a protective cover 108 is secured in position as shown by welding or by other suitable means.

In the position shown in FIG. 3, the locking device 86 is in its operative position - with the splines 104 engaged in the recesses 106 - such that the through-bore 92 in the rotatable valve member 90 is out of phase with the through bore or passage 94A and 94B and hence the fuel line 96A and 96B is not connected. Thus the vehicle is not operable because fuel will not be passed from a supply source to the engine of the vehicle.

When it is required that the vehicle be drivable, a key (not shown) is inserted in the locking device 86 and turned which causes rotational movement of the body of the locking device and connecting bar 88 such that, through the intermediary of the connecting bar 88, the valve member 90 may be rotated so as to bring the through-bore 92 into in-line communication with the through-bore or passage 94A and 94B. Hence the fuel line 96A and 96B is placed in line and in communication so that fuel can flow from the supply source to the engine of the vehicle.

Although not shown in the drawings, means will preferably be provided to limit the rotational movement of the rotatable valve member 90 such that upon turning of the key it can be ensured that the through-bore 92 travels to the required position.

Thus the invention provides a very effective, yet simple security device for safeguarding a vehicle from being driven away without authorisation. The safety device is located beneath the floor of the vehicle and is therefore not readily accessible, which in itself will or may act as a deterrent to a would-be thief or 'joy rider'. There are no removable items on the upper side of the floor and within the interior of the vehicle, thereby making it impossible for the device to be removed from within the vehicle.

Finally, whilst the safety devices of the invention have been described as being for insertion into a fuel line of a motor vehicle, it will be appreciated that the devices may be used in other situations, such as in air brake lines and in other fluid flow situations.

We claim:

1. A security device for insertion into a fluid flow line of a member, said device comprising a first body member locatable at one side of a floor or wall of said member and a second body member locatable at an opposite, second side of said floor or wall and being securable to said first body member, a rotatable locking device located in said first body member, and a rotatable valve member located in said second body member, said valve member being movable upon rotation of said locking device, from a first position allowing fluid to flow through said valve member to a second position preventing such flow, wherein said first and second body members are securable together by means located at said second side of said floor or wall, and engaging means extending from a surface of said first body member which confronts said floor or wall, said engaging means comprising a plurality of threaded shanks which are secured in blind bores in said surface of said first body member, and which pass through throughbores in said second body member, and are engageable by securing devices; whereby said security device is devoid of any release means at said one side of said floor or wall.

2. A security device according to claim 1, in which said shanks pass through throughbores (22) in said second body member and are engageable by securing devices comprising separable sleeves and nuts, said nuts being adapted to break away from said sleeves upon application of a certain torque to said nuts so as to secure said first and second body members together by said sleeves.

3. A security device according to claim 1, in which said first body member includes a domed portion for housing said locking device, said locking device being held captive within said first body member by means located beneath said domed portion and within the confines of said first body member.

4. A security device according to claims 1 or 4, in which said second body member includes a recess or bore for housing said rotatable valve member, said second body member including a throughbore communicating with said recess and said valve member when located therein.

5. A security device according to claim 4, in which said through-bore communicates with a through-bore in said valve member in the first position of said valve member.

6. A security device according to claim 3, in which said locking device has a body which includes parallel-sided portions which are engageable with parallel-sided portions of the first body member to prevent relative rotation between the body of the locking device and the first body member.

7. A security device according to claim 4, in which said valve member is retained in the recess or bore in the second body member (8) by means of a burred washer.

8. A security device according to any of claims 1, 2, 3, 6 or 7 in which said rotatable valve member carries a plurality of O-ring seals to prevent leakage of-fluid past said valve member and upwardly through said locking device.

9. A security device according to any one of claims 1 2, 3, 6 or 7, in which said device has a protective cover for said second body member.

* * * * *